US012753948B2

(12) United States Patent
Feng

(10) Patent No.: US 12,753,948 B2
(45) Date of Patent: Oct. 6, 2026

(54) APPARATUS AND METHOD FOR AN ADJUSTABLE FILTER RACK

(71) Applicant: Midea Group Co., Ltd., Foshan (CN)

(72) Inventor: Yinshan Feng, Jeffersonville, IN (US)

(73) Assignee: MIDEA GROUP CO., LTD., Beijiao (CN)

( * ) Notice: Subject to any disclaimer, the term of this patent is extended or adjusted under 35 U.S.C. 154(b) by 261 days.

(21) Appl. No.: 18/429,266

(22) Filed: Jan. 31, 2024

(65) Prior Publication Data

US 2025/0244048 A1 Jul. 31, 2025

(51) Int. Cl.

*B01D 53/02* (2006.01)
*B01D 46/00* (2022.01)
*F24F 13/28* (2006.01)

(52) U.S. Cl.

CPC .......... *F24F 13/28* (2013.01); *B01D 46/0006* (2013.01); *B01D 2265/025* (2013.01); *B01D 2279/50* (2013.01)

(58) Field of Classification Search

CPC .......... B01D 2265/025; B01D 2279/50; B01D 46/0006; F24F 13/28

See application file for complete search history.

(56) References Cited

U.S. PATENT DOCUMENTS

| | | | | |
|---|---|---|---|---|
| 5,628,818 A * | 5/1997 | Smith | B03C 3/82 96/77 |
| 5,788,729 A | 8/1998 | Jurgensmeyer | |
| 6,223,547 B1 * | 5/2001 | da Silva | F24F 1/022 62/262 |
| 8,211,198 B2 | 7/2012 | Weber | |
| 10,363,508 B2 | 7/2019 | Hugues | |
| 10,434,448 B1 * | 10/2019 | Honnecke | F24F 13/28 |
| 10,641,520 B2 | 5/2020 | Conrad | |
| 11,439,937 B2 | 9/2022 | Vaidya | |
| 11,578,878 B2 | 2/2023 | D'Souza et al. | |
| 2009/0111369 A1 * | 4/2009 | Carrig | B08B 15/00 55/356 |
| 2010/0154368 A1 * | 6/2010 | Kopec | B01D 46/88 55/493 |
| 2012/0204523 A1 * | 8/2012 | Woolard | B01D 46/10 55/357 |
| 2017/0284699 A1 * | 10/2017 | Ezequiel | F24F 13/28 |
| 2020/0061635 A1 * | 2/2020 | Wiser, III | B01D 53/885 |
| 2020/0101408 A1 * | 4/2020 | Brown | F24F 1/0073 |
| 2020/0269171 A1 * | 8/2020 | Vaidya | B01D 46/58 |
| 2020/0269172 A1 * | 8/2020 | Singh | B01D 46/0005 |

FOREIGN PATENT DOCUMENTS

| | | |
|---|---|---|
| CN | 115337715 A | 11/2022 |
| WO | 0150072 A1 | 7/2001 |

* cited by examiner

*Primary Examiner* — Christopher P Jones

(74) *Attorney, Agent, or Firm* — Gray Ice Higdon

(57) ABSTRACT

A rack for an air conditioning unit is disclosed, and more particularly, an adjustable rack for positioning a variety of air filters of different sizes. The rack and/or air conditioning unit may include one or more racks pivoting relative to one or more portions of the air conditioning unit to releasably engage the air filter in one or more positions.

18 Claims, 10 Drawing Sheets

APPARATUS AND METHOD FOR AN ADJUSTABLE FILTER RACK

BACKGROUND

The present embodiments relate to a filter rack for one or more filters of a variety of sizes.

Typical air filters include a frame containing filter media therein removably mounted into air conditioning systems. The air filter is retained in the system to filter air passing through the system, or portions thereof. Accordingly, particles or other contaminants are captured in the air filter and removed from the air flow. The air filter may be periodically replaced or changed to obtain a variety of air characteristics. However, this practice may not allow for easy installation of the air filter, not allow for multiple filter sizes, and/or reduce retention of the air filter that often creates filter noise with movement of the air filter during operation (e.g. blower startup, blower shutdown) of the system. Thus, there is a need to improve, but is not limited to, the rack engagement with the air filter and/or the adjustability of the filter rack.

SUMMARY

In some embodiments, an air conditioning unit may comprise a filter housing having an opening to a filter receiving compartment, wherein the filter receiving compartment may include opposing side walls therein. In various embodiments, the unit may include a pair of first guide rails positioned on the opposing side walls respectively, wherein the pair of first guide rails may include a proximal end adjacent the opening and a distal end distal from the opening. In some embodiments, the unit may include one or more first pivot mechanisms spaced a first distance from the pair of first guide rails and/or wherein the one or more first pivot mechanisms may be adjacent the distal end of the pair of first guide rails. In various embodiments, the unit may include one or more first retention mechanisms spaced a second distance from the pair of first guide rails, wherein the one or more first retention mechanisms may be adjacent the proximal end of the pair of first guide rails. In some embodiments, the unit may include a rack having a proximal end adjacent the one or more first retention mechanisms and a distal end adjacent the one or more first pivot mechanisms, wherein the distal end of the rack may be configured to pivot adjacent the one or more first pivot mechanisms thereby pivoting the proximal end of the rack from a first pivot position towards the proximal end of the first guide rails to a second pivot position to decrease a first filter space defined between the rack and the pair of first guide rails, and wherein the one or more first retention mechanisms may engage the proximal end of the rack when in the second pivot position.

In addition, in some embodiments, the unit may include a pair of first rails positioned between the one or more first pivot mechanisms and the pair of first guide rails, wherein the rack may slidably engage the pair of first rails and/or the pair of first rails may add flow resistance to the air by-pass flow around the filter. In various embodiments, the unit may include one or more second pivot mechanisms may be spaced a third distance from the pair of first guide rails, wherein the third distance is larger than the first distance, and one or more second retention mechanisms may be spaced a fourth distance from the pair of first guide rails, wherein the fourth distance is larger than the second distance, and wherein the distal end of the rack may be configured to pivot adjacent the one or more second pivot mechanisms thereby pivoting the proximal end of the rack from a first pivot position towards the proximal end of the pair of first guide rails to a second pivot position to decrease a second filter space defined between the rack and the pair of first guide rails, and wherein the one or more second retention mechanisms may engage the proximal end of the rack when in the second pivot position. In some embodiments, the unit may include a pair of second guide rails positioned further away from the pair of first guide rails than the one or more first pivot mechanisms and the one or more first retention mechanisms. In various embodiments, the one or more first pivot mechanisms may be at least one of a pin and/or an elongated member. In some embodiments, the one or more first pivot mechanisms may be the elongated member, wherein the elongated member may include a proximal end adjacent the proximal end of the pair of first guide rails and a distal end adjacent the distal end of the pair of first guide rails, and wherein the elongated member may be angled relative to the pair of first guide rails whereby the proximal end of the elongated member is positioned further from the pair of first guide rails than the distal end of the elongated member.

In some embodiments, an air conditioning unit may comprise at least one guide rail. In various embodiments, the unit may include a rack spaced from at least one guide rail to define a first filter space, wherein the rack may be positionable between a first pivot position and a second pivot position relative to the at least one guide rail to adjust the size of the first filter space, when in the first pivot position one end of the first filter space may be larger than an opposing end of the first filter space and when in the second pivot position the one end and the opposing end of the first filter space may be substantially the same. In some embodiments, when the rack is in the first pivot position the one end of the first filter space may be configured to stow and/or deploy an air filter, and wherein when the rack is in the second pivot position the rack may not be configured to stow and/or deploy the air filter.

In addition, in some embodiments, when in the first pivot position the rack may be disengaged from the air filter and wherein when in the second pivot position the rack may be engaged to the air filter. In various embodiments, when in the second pivot position the rack may be configured to apply a pressure across a planar surface of the air filter from one or more pivot mechanisms engaging one end of the rack to an opposing pivoting end of the rack. In some embodiments, the rack may slidably engage one or more pivot mechanisms. In various embodiments, the rack may be spaced from at least one guide rail to define a second filter space, wherein the rack may be positionable between a first pivot position and a second pivot position relative to the at least one guide rail to adjust the size of the second filter space. In some embodiments, at least one guide rail may be a pair of guide rails. In various embodiments, the unit may include one or more retention mechanisms engaging the rack when in the second pivot position. In various embodiments, the unit may include one or more pivot mechanisms. In some embodiments, the one or more pivot mechanisms may include a pair of pivot mechanisms spaced from each other on opposing side walls of the air conditioning unit.

In some embodiments, a method of adjusting a rack to position an air filter within an air conditioning unit may comprise providing an air conditioning unit having one or more guide rails and one or more pivot mechanisms positioned away from the one or more guide rails. In various embodiments, the method may include pivoting a rack from the one or more pivot mechanisms relative to the one or more guide rails. In some embodiments, the method may include adjusting one or more filter spaces configured to receive one or more air filters.

In addition, in some embodiments, pivoting the rack may include the steps of disengaging the air filter in a first pivot position and/or engaging the air filter in a second pivot position. In various embodiments, adjusting the one or more filter spaces may include decreasing and/or increasing the size of the one or more filter spaces when pivoting the rack. In various embodiments, the method may include slidably engaging the rack to the one or more pivot mechanisms. In some embodiments, the one or more pivot mechanisms may include a first pivot mechanism proximal to the one or more guide rails and a second pivot mechanism distal to the one or more guide rails, and further comprising selecting the first pivot mechanism or the second pivot mechanism to correspond to a size of the air filter. In various embodiments, the method may include releasably engaging the rack in at least one pivot position relative to the one or more guide rails.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present disclosure is provided in the following written description of various embodiments of the disclosure, illustrated in the accompanying drawings, and defined in the appended claims.

DETAILED DESCRIPTION

It is to be understood that an air conditioning unit or air handling system 10, filter housing, 30 and/or filter rack 20, or portions thereof, is not limited in its application to the details of construction and the arrangement of components set forth in the following description or illustrated in the exemplary drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to direct physical or mechanical connections or couplings.

Figure 1:
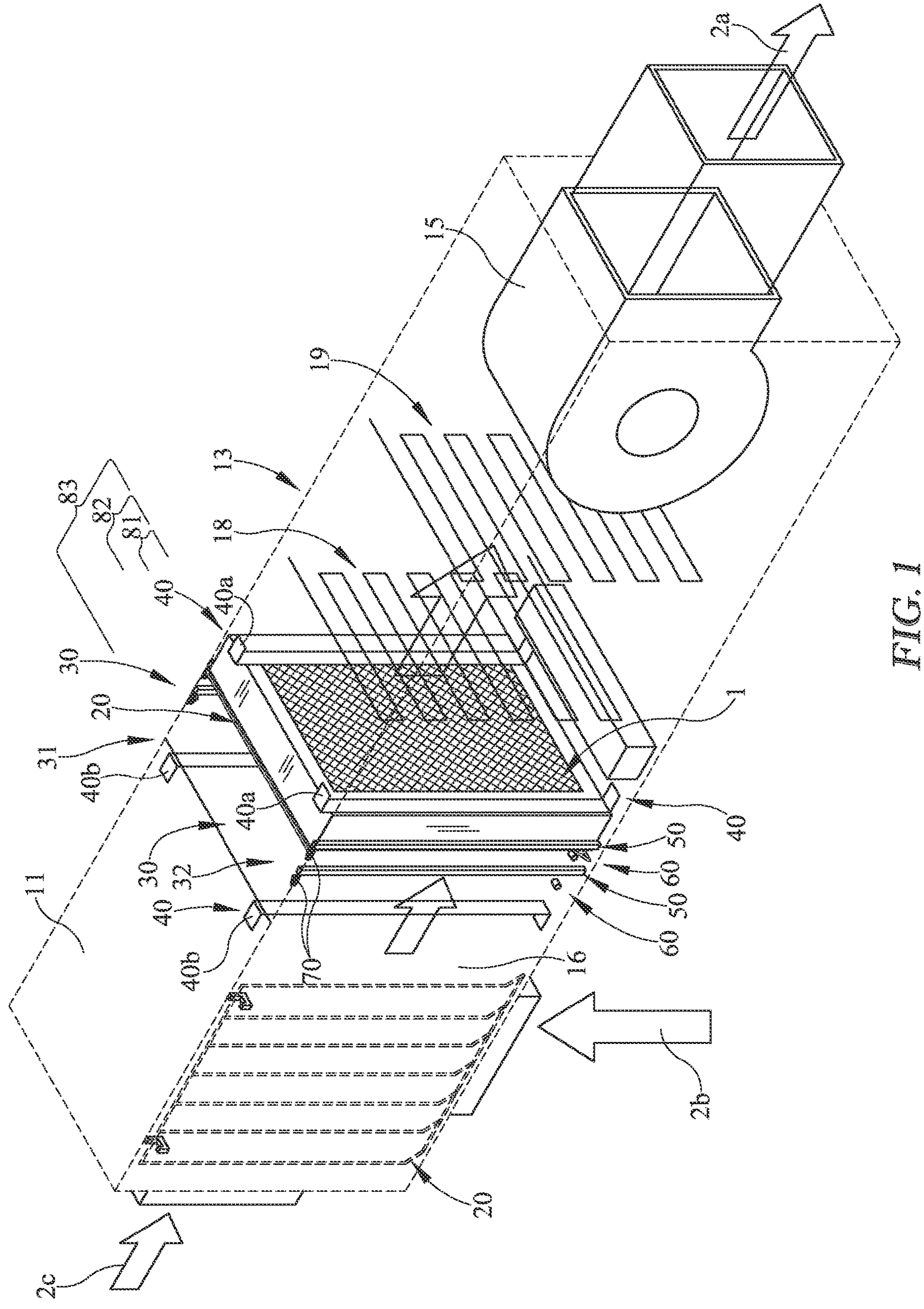
FIG. 1 is a perspective view of one embodiment of an air handling system with a filter rack in at least one first configuration or pivot position (e.g. second) in accordance with various embodiments, illustrating one embodiment of an air filter (e.g. 1 inch) stowed in a first filter space within a filter housing and/or system and engaged by the rack.
Figure 2:
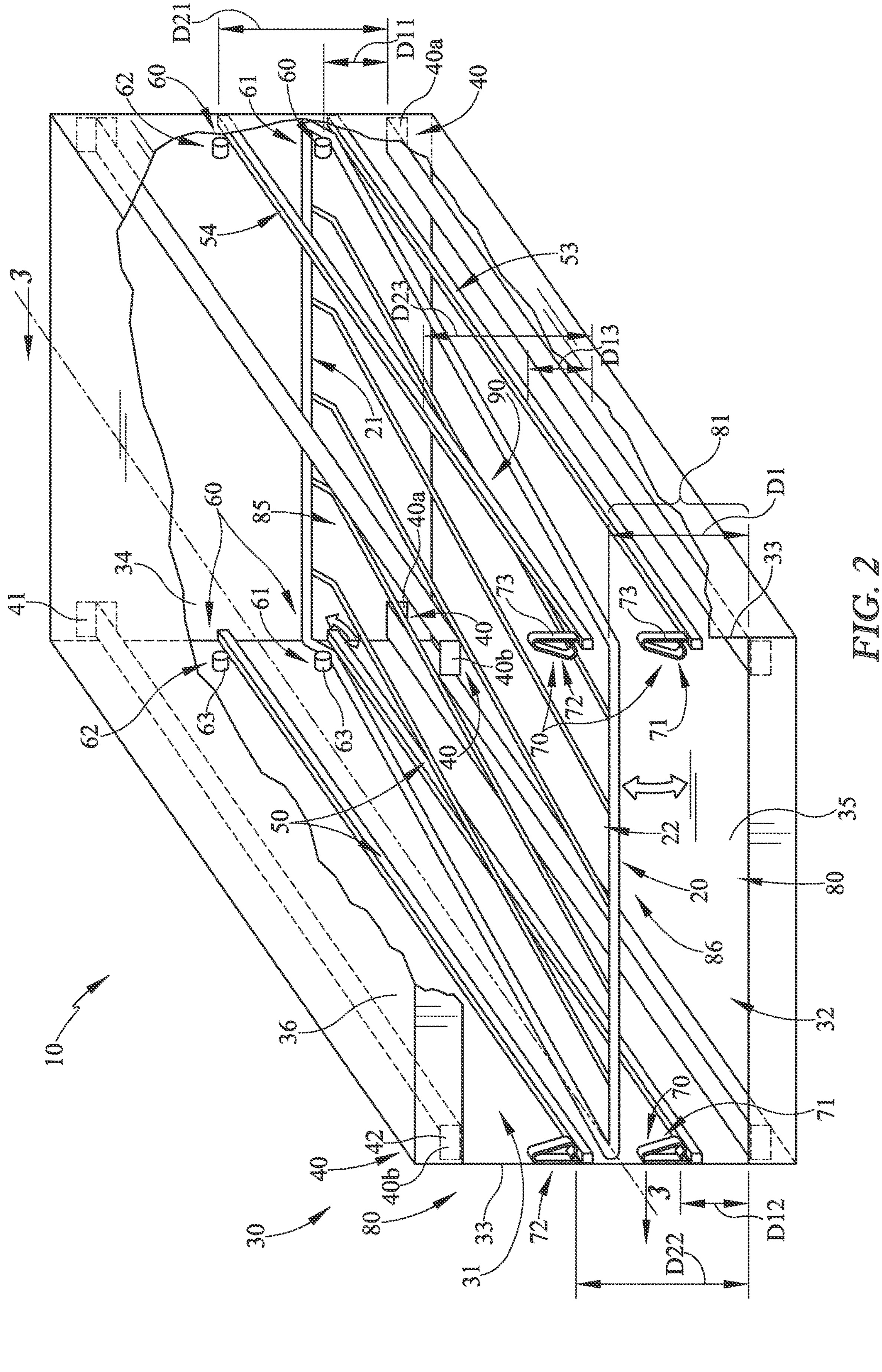
FIG. 2 is an enlarged perspective view of the filter housing of FIG. 1, illustrating the rack in a first pivot position with the air filter deployed and a first retention mechanism disengaged from the rack.

Turning now to the drawings and in particular FIGS. 1-10, wherein like numbers denote like parts throughout the several views, one or more filter racks 20 in accordance with various embodiments may be mounted in at least one filter housing 30 used for an air conditioning unit 10, or other application. The type, size, shape, and construction of the air conditioning unit 10 may be varied while remaining within the scope of the present disclosure. In some embodiments, as shown in FIG. 1, the air conditioning unit 10 may be mounted in any number of configurations to meet different air handling applications, however, it will be herein described as being employed as an air conditioning system for providing comfort air **2*a* to a building. Return air 2*b* from the comfort zone is initially brought into housing 11 and then enters an elongated air duct 13. Under the influence of supply air fan 15, the air is drawn through the duct where it is mixed with outside air 2*c* in one or more plenums 16. The air is then passed through a series of heat exchangers 18-19 where the air is either heated (e.g. heating coil 19) or cooled (e.g. cooling coil 18) depending on the demand placed on the system. Positioned within the housing 11 is a filter housing 30 containing one or more racks 20 and/or one or more guide rails 40 upon which different air filter arrangements can be mounted for removing contaminants from the air stream moving through the duct 13. As will be explained in greater detail below, the rack 20 can be selectively arranged in various positions, or lack thereof in some embodiments, to define one or more filter spaces 80 (e.g. first 81, second 82, third 83, etc.) to receive/position one or more air filters 1** for an application.

Figure 9:
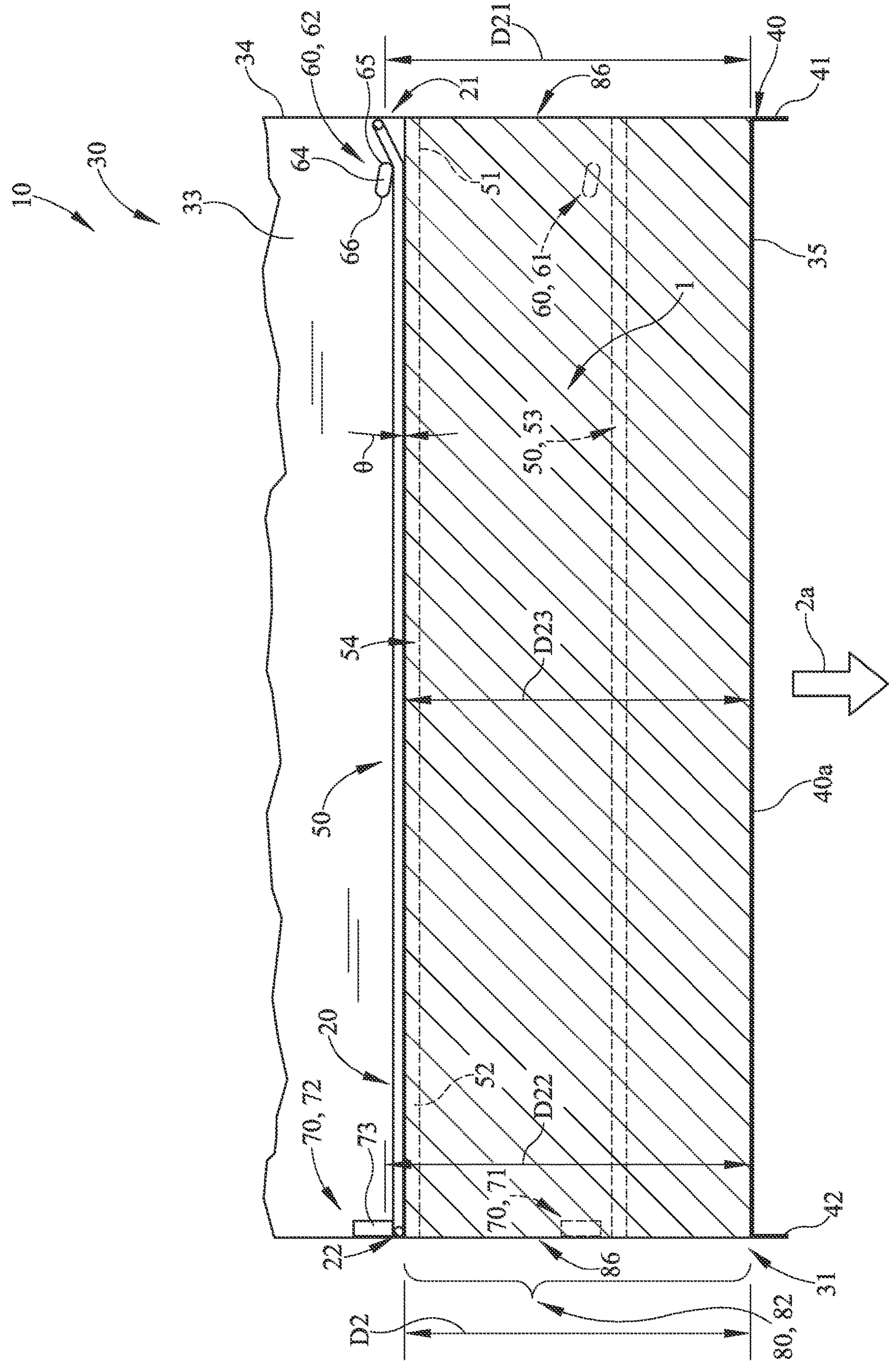
FIG. 9 is a side sectional of the filter housing taken along line 9-9 of FIG. 8, illustrating the rack in the second pivot position engaged with the air filter.
Figure 10:
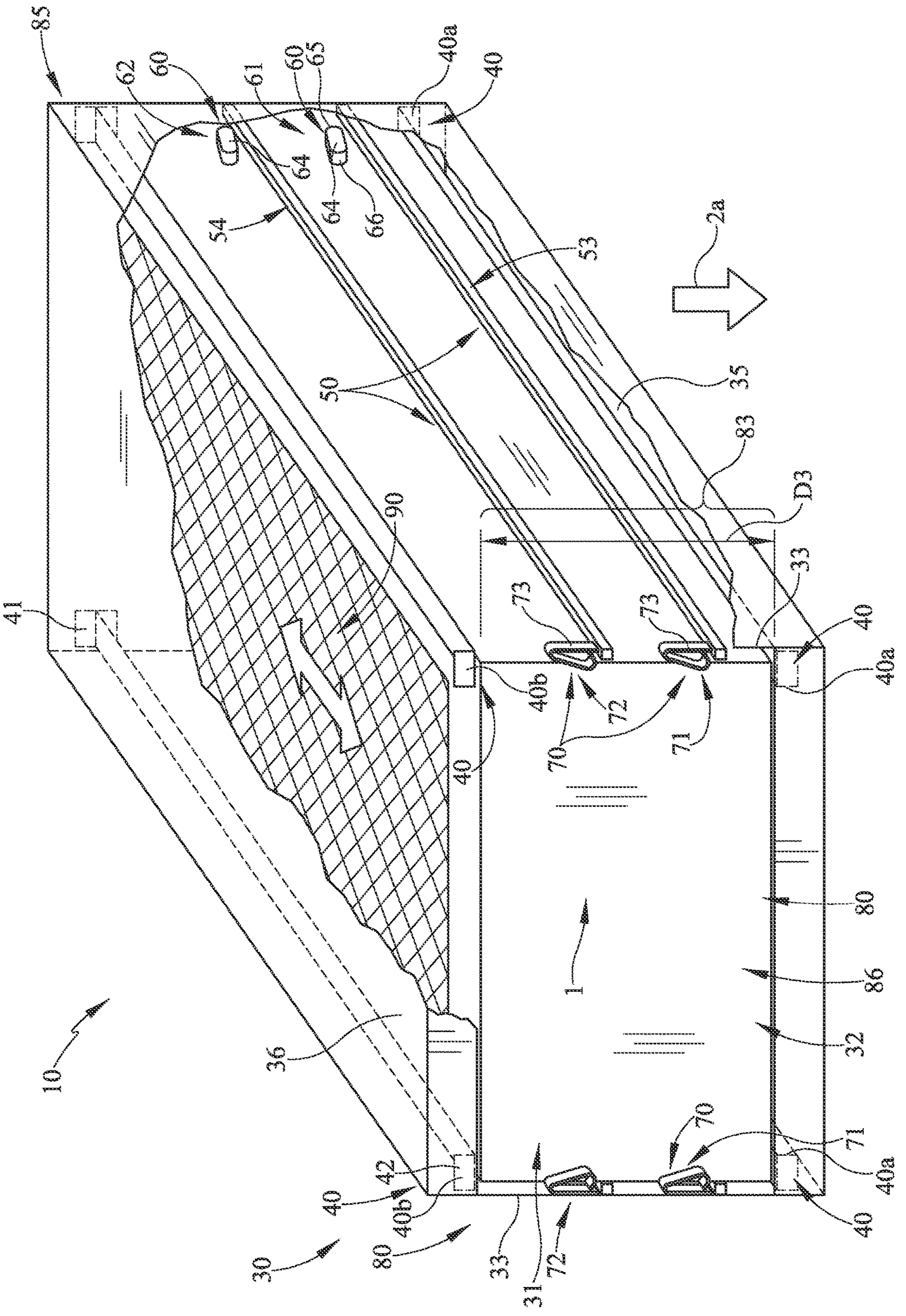
FIG. 10 is an enlarged perspective view of the filter housing of FIG. 1 illustrating another air filter (e.g. 4 inch) stowed in another or third filter space within the filter housing and/or system, illustrating the rack not used in the filter housing.

Referring now to FIGS. 1-10, one or more racks 20 may be adjustable between one or more positions/locations (e.g.

first, second, third, etc.) within the filter housing 30 and/or air conditioning unit 10 to receive/engage one or more air filters 1 of a variety of sizes and/or define one or more filter spaces 80. The filter housing 30 may define an opening 31 into a filter receiving compartment or cavity 32. A door/panel (not shown) may allow access to the air filter 1 through the opening 31 into and out of the filter receiving compartment 32 and/or filter space 80 (e.g. first, second, etc.). The filter housing 30, compartment 32, and/or air conditioning unit 10, or portions thereof, may include one or more guide rails 40. When the rack 20 is in a first position (e.g. selected by the user or application) as shown in FIGS. 1-5, the rack 20 may be spaced away from or may be a first distance D1 from the one or more guide rails 40. For example, the rack 20 in the first position may engage the air filter 1 and/or define a first filter space 81 (e.g. 1 inch filter, a first thickness size in between upstream and downstream surfaces). When the rack 20 is in a second position (e.g. selected by the user or application) as shown in FIGS. 6-9, the rack 20 may be spaced away from or may be a second distance D2 (e.g. greater than the first distance D1) from the one or more guide rails 40. For example, the rack 20 in the second position may engage the air filter 1 (e.g. another) and/or define a second filter space 82 (e.g. 2 inch filter, a second thickness size in between upstream and downstream surfaces). In some embodiments, the rack 20 may not be used such that the filter 1 is engaged by the one or more guide rails 40. When the rack 20 is in a third position (e.g. selected by the user or application, removed, stowed away therefrom) as shown in FIG. 10, a third distance D3 (e.g. greater than both the first and second distances D1, D2) may be defined from the one or more guide rails 40 without the rack 20. For example, the rack 20 in the third or removed position the one or more guide rails 40 may engage the air filter (e.g. opposing surfaces, upstream, downstream) and/or define a third filter space (e.g. 4 inch filter, a third thickness size in between upstream and downstream surfaces). In the third position, the third distance D3, the air filter 1, and/or third filter space 83 may be defined between one or more first guide rails 40*a* (e.g. pair of spaced apart rails) spaced from one or more second guide rails 40*b* (e.g. pair of spaced apart guide rails). When in the third position, the rack 20 may be stored exterior to the duct 13 or housing 11 in some embodiments as shown in broken lines in FIG. 1. Although the one embodiment shows at least three positions of the adjustable filter, it should be understood that a variety of positions, filter spaces, and/or filter sizes may be used and still be within the scope of the invention. For example, the filter housing and/or rack may include a single position and corresponding single filter size/space.

Figure 3:
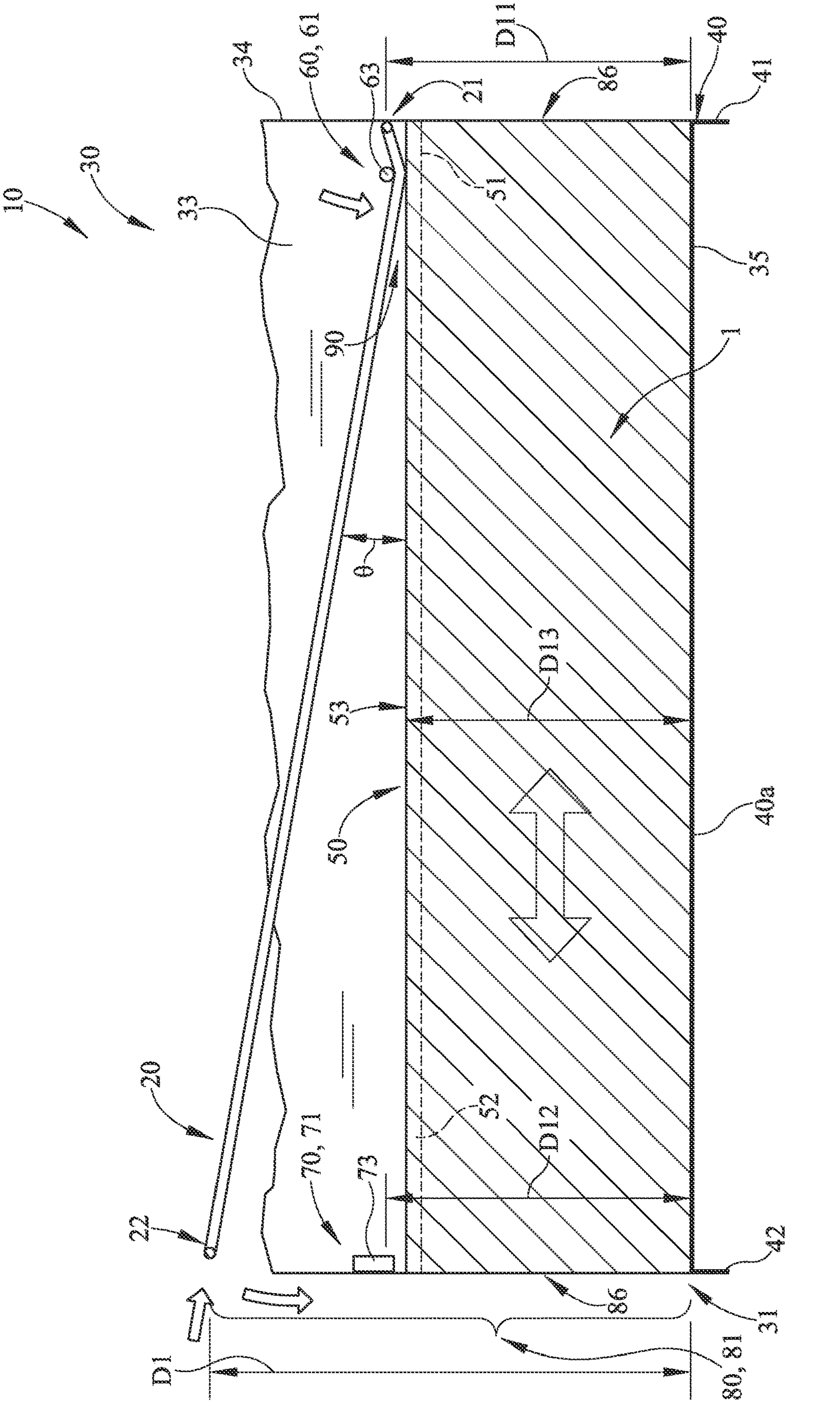
FIG. 3 is a side sectional of the filter housing taken along line 3-3 of FIG. 2, illustrating the rack in the first pivot position disengaged from the air filter.
Figure 4:
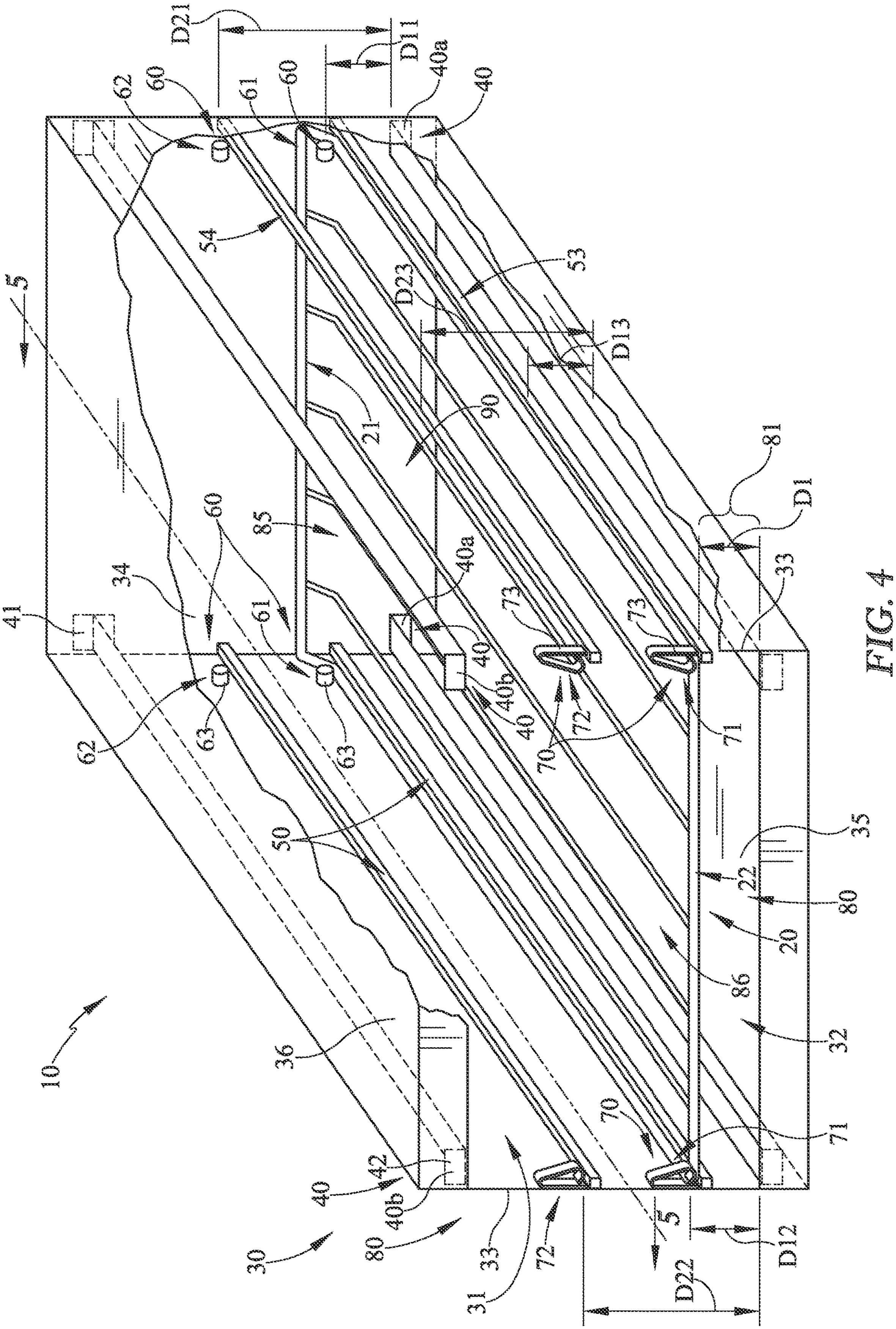
FIG. 4 is an enlarged perspective view of the filter housing of FIG. 1, illustrating the rack in a second pivot position with the air filter broken away and the first retention mechanism engaged with the rack.
Figure 5:
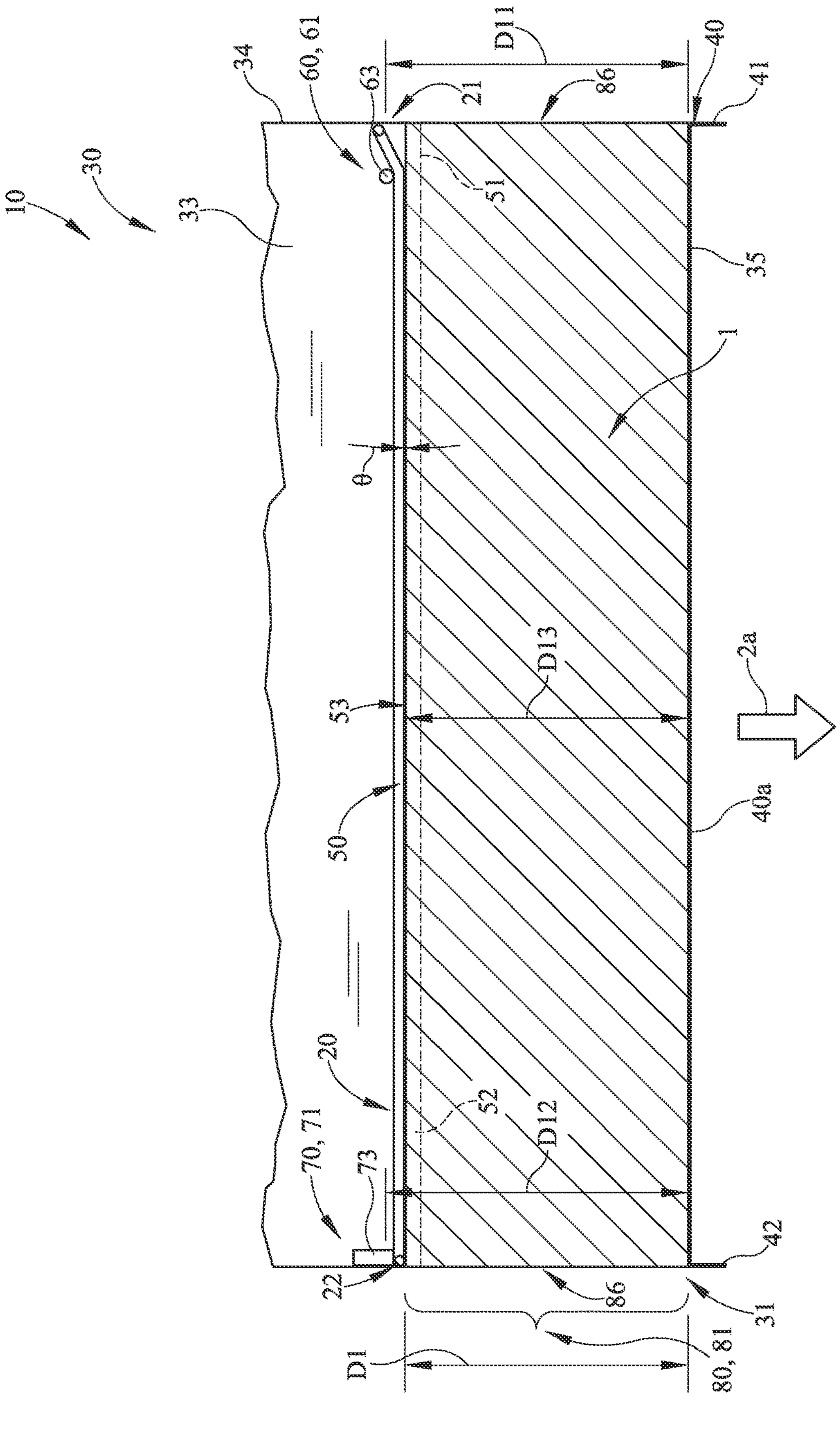
FIG. 5 is a side sectional of the filter housing taken along line 5-5 of FIG. 4, illustrating the rack in the second pivot position engaged with the air filter.
Figure 6:
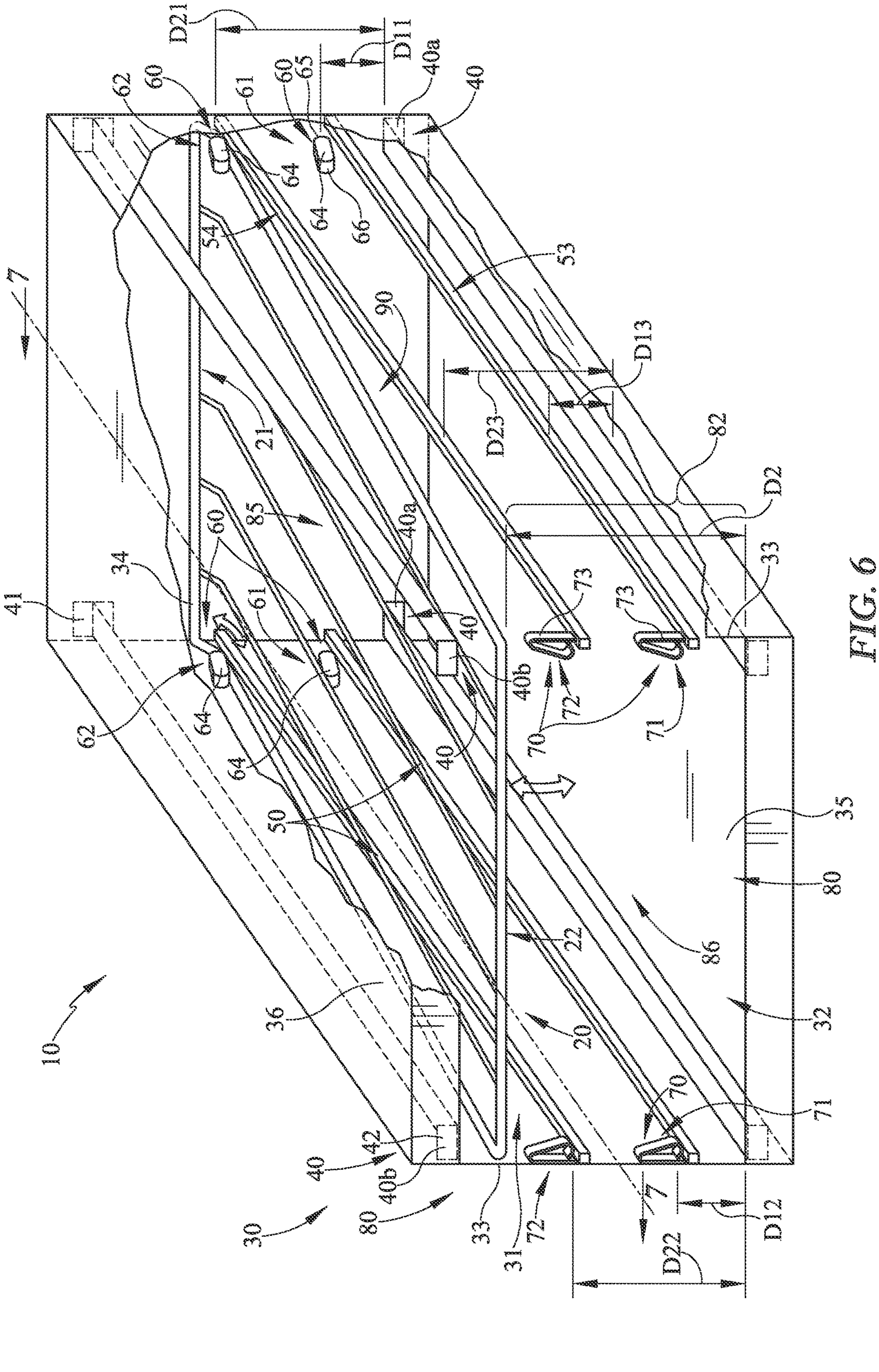
FIG. 6 is an enlarged perspective view of the filter housing of FIG. 1 illustrating another air filter (e.g. 2 inch) stowed in another or second filter space within the filter housing and/or system, illustrating the rack in a first pivot position with the air filter deployed and a second retention mechanism disengaged from the rack.
Figure 7:
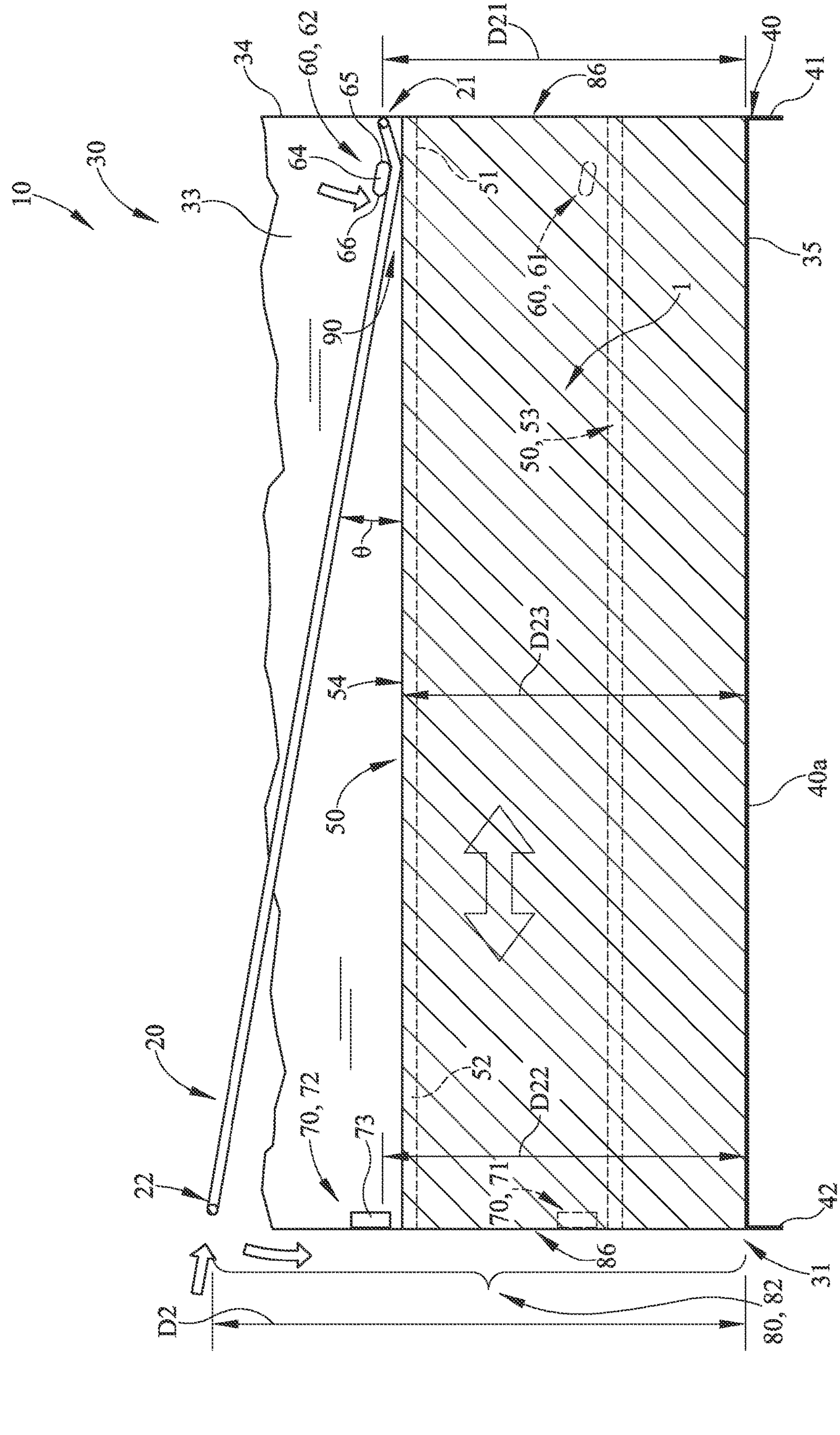
FIG. 7 is a side sectional of the filter housing taken along line 7-7 of FIG. 6, illustrating the rack in the first pivot position disengaged from the air filter.
Figure 8:
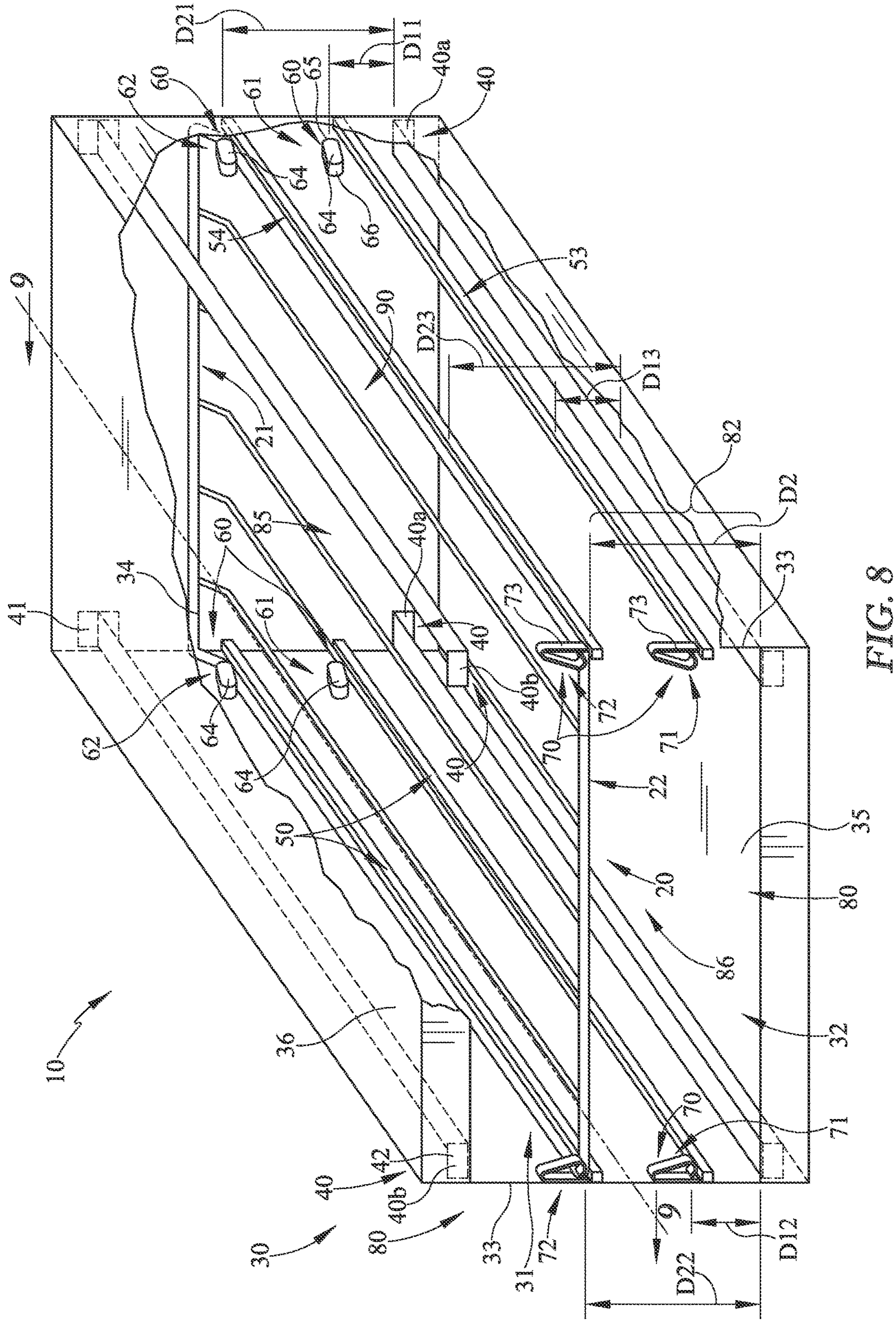
FIG. 8 is an enlarged perspective view of the filter housing of FIG. 6 illustrating the rack in a second pivot position with the air filter broken away and the second retention mechanism engaged with the rack.

In some implementations, the one or more racks 20 may releasably engage the one or more air filters 1 in the one or more positions (e.g. pivot) of the rack 20. In the one embodiment shown, the rack 20 may pivot in the one or more of the positions (e.g. first, second, etc.) within the filter housing 30 and/or air conditioning unit 10 to engage/disengage from the air filter 1. In a first pivot position as shown in FIGS. 2, 3, 6, and 7, the rack 20 may be disengaged from the air filter 1, or portions thereof. In a second pivot position as shown in FIGS. 1, 4, 5, 8, and 9, the rack 20 may be engaged to the air filter 1, or portions thereof. In the one or more positions within the filter housing and/or unit 10, the rack 20 may pivot between a plurality of pivot positions. The plurality of pivot positions of the rack 20 in at least one position varies or adjusts the size/shape of the filter space 80 (e.g. first 81, second 82, etc., end). In at least one first pivot position as best shown in FIGS. 3 and 7, the rack 20 may be angled (e.g. angle θ) relative to the one or more guide rails 40 (e.g. 40*a*) and/or rails 50. In at least one second pivot position as best shown in FIGS. 5 and 9, the rack 20 may be substantially parallel to the one or more guide rails 40 (e.g. 40*a*) and/or be at angle θ (e.g. pivot, zero) less than the first pivot position. In the first pivot position, the filter space 80 (e.g. at least one end/opening) may be larger than when the rack is in the second pivot position. When the rack 20 is in the first pivot position (e.g. FIGS. 3 and 7), the air filter 1 may be configured to be stowed and/or deployed from the filter space 80, opening 31, compartment 32, and/or air filter housing 30. Further when the rack 20 is in the first pivot position, the rack 20 may not be engaged to the air filter 1 and/or retention mechanism 70, if used. When the rack 20 is in the second pivot position (e.g. FIGS. 5 and 9), the air filter 1 may not be configured to be stowed and/or deployed from the filter space 80, opening 31, compartment 32, and/or air filter housing 30. Further when the rack 20 is in the second pivot position, the rack 20 may be engaged to the air filter 1 and/or retention mechanism 70, if used. In some embodiments, when the rack 20 is pivoted from the first pivot position towards the second pivot position, the filter space 80 (e.g. proximal or one end opening adjacent the filter housing opening) may decrease in size and/or rack engages (e.g. more, increases) the air filter 1. Alternatively stated, when the rack 20 is pivoted from the second pivot position towards the first pivot position, the filter space (e.g. proximal or one end opening adjacent the filter housing opening) may increase in size and/or rack disengages (e.g. less, decrease) from the air filter. When in the second pivot position, the rack 20 may be configured to apply a pressure (e.g. evenly, squeeze) across a planar surface (e.g. upstream surface of frame/filter media, downstream surface of frame/filter media) of the air filter (e.g. from one or more pivot mechanisms 60 engaging one end 21 of the rack to an opposing pivot end 22 of the rack).

In some implementations, the air conditioning unit 10, filter housing 30, and/or rack 20, or portions thereof, may include one or more pivot mechanisms 60. The one or more pivot mechanisms 60 may be configured to pivot the rack 20 between one or more pivot positions. Each filter space 80 (e.g. first 81, second 82, third, etc.) may include a corresponding pivot mechanism (e.g. first 61, second 62, third, etc.). For example as shown in the one embodiment, one or more first pivot mechanisms 61 may be spaced from the one or more guide rails 40 (e.g. pair 40*a*) corresponding to the first filter space 81 by a first distance D11. One or more second pivot mechanisms 62, if used, may be spaced from the one or more guide rails 40 (e.g. pair 40*a*) corresponding to the second filter space by a second distance D21 larger than the first distance D11. The one or more pivot mechanisms 60 may be one or more pins 63 as shown in the one embodiment in FIGS. 1-5. Although two pins 63 are positioned at opposing side walls 33 of the filter receiving compartment 32 or filter housing 30, it should be understood that a single pin 63 may be used. In the one embodiment shown in FIGS. 6-10, the one or more pivot mechanisms 60 may be one or more elongated members 64. The one or more elongated members 64 may be distal from the opening 31 and/or be two elongated members 64 at opposing side walls 33 of the filter receiving compartment 32 or filter housing 30. The one or more elongated members 64 may be a variety of lengths. The pivot mechanism(s) 60 and/or pivoting end 22 of the rack 20 may be adjacent the distal end 41, 51 of the guide rail(s) 40/rail(s) 50, back wall 34 of the filter receiving compartment 32/housing 30 between the side walls 33, distal from the opening 31. The rack 20 may slidably engage the one or more pivot mechanisms 60 (e.g. corresponding to the one or more filter spaces 80). The elongated member 64 of the pivot mechanism 60 may be angled relative to the guide rail 40 and/or rail 50. The proximal end 66 of the elongated member 64 may be further away from the rail 50/guide rail 40 than the distal end 65 in some embodiments. It should be understood that the pivot mechanism may be of a variety of shapes, sizes, positions, quantities, and constructions and still be within the scope of the invention. For example, the length of the elongated member 64 may longer than shown in the one embodiment such that the proximal end 66 of the elongated member 64 may be adjacent the opening 31 in some embodiments.

In some implementations, the air conditioning unit 10, filter housing 30, and/or rack 20, or portions thereof, may include one or more retention mechanisms 70. The one or more retention mechanisms 70 may be configured to releasably engage the rack 20 in at least one pivot position (e.g. second pivot position). Retention mechanism may releasably lock the filter in the stowed and/or second pivot position (e.g. operating position). Each filter space 80 (e.g. first, second, third, etc.) may include a corresponding retention mechanism (e.g. first, second, third, etc.). For example as shown in the one embodiment, one or more first retention mechanisms 71, if used, may be spaced from the one or more guide rails 40 (e.g. pair 40*a*) corresponding to the first filter space 81 by a first distance D12. One or more second retention mechanisms 72, if used, may be spaced from the one or more guide rails 40 (e.g. pair 40*a*) corresponding to the second filter space 82 by a second distance D22 larger than the first distance D12. The one or more retention mechanisms 70 may be one or more latches 73 (e.g. spring loaded, biased). Although two latches 73 are positioned at opposing side walls of the filter receiving compartment 32 for a corresponding filter space 80, it should be understood that a single latch may be used. The latch 73 and/or retention mechanism 70 may automatically engage the rack when the rack is in the second pivot position and/or when the rack pivots from the first pivot position to the second pivot position. The user/rack may depress/bias the latch and/or retention mechanism out of engagement with the rack to pivot the rack from the second pivot position to the first pivot position, and/or vice versa. It should be understood that the retention mechanism, if used, may be of a variety of shapes, sizes, positions, quantities, and constructions and still be within the scope of the invention. For example, the retention mechanism may be a clip, screw, fastener, tie, etc. The retention mechanism 70 may secure (e.g. releasably) the pivoting end 22 of the rack 20 and/or the pivot mechanism 60 may secure the distal end 21 of the rack 20 against the air filter 1 to secure the air filter in place/position (e.g. when in the second pivot position).

In some implementations, the air conditioning unit 10, filter housing 30, and/or rack 20, or portions thereof, may include one or more guide rails 40. The one or more guide rails may be configured to support one side (e.g. upstream, downstream) of the air filter 1 opposite to the rack (e.g. second pivot position). The guide rail(s) 40 may correspond to each one of the filter spaces 80 (e.g. first, second, third, etc.). The air filter 1 may abut or slidably engage the guide rail(s) 40 when stowing/deploying. The guide rails 40 (e.g. first 40*a*, first pair) may be positioned on opposing side walls 33 and/or within the filter receiving compartment 32. The guide rails may be adjacent a bottom/top wall of the compartment 32/housing 30. The guide rails 40 may be elongated and/or extend from the opening 31 to the back wall 34 of the compartment/housing. The guide rail(s) 40 may be a pair of guide rails on the opposing side walls 33, respectively. A proximal end 42 of the of the guide rail 40 may be adjacent the opening 31 and/or the distal end 41 of the guide rail 40 may be distal to or spaced away from the opening 31 and/or adjacent the back wall 34. Although a pair of guide rails (e.g. 40, 40*a*, 40*b*) are positioned at opposing side walls of the filter receiving compartment 32, it should be understood that a single guide rail may be used. It should be understood that the guide rail may be of a variety of shapes, sizes, positions, quantities, and constructions and still be within the scope of the invention. The guide rails may be elongated metal panels/sheets/members.

In some implementations, a plurality of guide rails 40 and/or filter housing, or portions thereof, may define a filter space 80 (e.g. 83). As shown in the one embodiment, a first guide rail(s) 40*a* (e.g. first pair) may be spaced from a second guide rail 40*b* (e.g. second pair). The first guide rail 40*a* may be positioned adjacent the bottom wall 35 of the compartment/housing and the second guide rail 40*b* may be positioned adjacent the top wall 36 of the compartment/housing. When the rack is in the third position and/or removed from the filter housing/compartment/pivot mechanism, the third filter space 83 may be defined between the first guide rail 40*a* (e.g. first pair) and the second guide rail 40*b* (e.g. second pair). The first and second guide rails 40*a*, 40*b* may engage/abut/slidably engage the air filter (e.g. upstream surface(s), downstream surface(s)) when stowing/deploying and/or when stowed. If the second guide rail is used, the third filter space 83 may receive the air filter (e.g. 4 inch) without using a rack as shown in FIG. 10.

In some implementations, the air conditioning unit, filter housing, and/or rack, or portions thereof, may include one or more rails 50. The rack 20 may be configured to releasably/slidably engage the rails 50/pivot mechanism 60 in one or more pivot positions. For example, when the rack is pivoted, stowed, and/or deployed from within the filter housing 30. Each filter space 80 (e.g. first 81, second 82, etc.) may include a corresponding rail(s) 50 (e.g. first, second, etc.). For example as shown in the one embodiment, one or more first rails 53 (e.g. first pair) may be spaced from the one or more guide rails 40 (e.g. pair 40*a*) corresponding to the first filter space 81 by a first distance D13. One or more second rails 54 (e.g. second pair), if used, may be spaced from the one or more guide rails 40 (e.g. pair 40*a*) corresponding to the second filter space 82 by a second distance D23 larger than the first distance D13. The one or more rails 50, if used, may be positioned between the pivot mechanism 60 and the guide rail(s) 40. The one or more pivot mechanisms 60 may be spaced from the rails 50 and/or the air filter 1. The rack 20 may slidably engage the rail(s) 50, if used, and/or air filter 1 in one or more pivot positions (e.g. first pivot position, angle) towards and/or to engage (e.g. slidably) the pivot mechanism 60. In some embodiments, the rail 50, if used, and/or air filter 1 may define an insertion space 90 to the pivot mechanism 60 to allow the rack to pass through and pivot therein. In some embodiments when the rail(s) 50 is not used, the rack 20 may slidably engage the air filter 1 in one or more pivot positions towards and/or to engage (e.g. slidably) the pivot mechanism 60. If a rail is not used the insertion space, or portions thereof, may be defined as between the pivot mechanism and the air filter, or merely the space between the pivot mechanism and the guide rail. In some embodiments, the rail 50 (e.g. distal end 51) may extend or be positioned between the pivot mechanism 60 and the opening 31. The one or more rails 50 may be one or more elongated. Although a pair of rails are positioned at opposing side walls 33 of the filter receiving compartment

32, it should be understood that a single rail may be used at one or more filter spaces. It should be understood that the one or more rails may be of a variety of shapes, sizes, positions, quantities, and constructions and still be within the scope of the invention. The rails may be elongated metal panels/sheets/members. For example as shown, the rails 50 may be parallel to the guide rails 40. The one or more rails 50 may reduce the by-pass of air flow (e.g. air leakage) around the filter (e.g. stowed, installed), or portions thereof. Alternatively stated, the rails 50 may add flow resistance to the air by-pass flow around the filter.

In some implementations, the rack 20 may be of a variety of shapes, sizes, quantities, positions, and constructions and still be within the scope of the invention. In the one embodiment shown, the rack 20 and/or rack body may include a proximal/pivoting end 22 and a distal end 21. The rack 20 may include a plurality of openings through from the upstream side to the downstream side. The proximal end 22 may be adjacent the one or more retention mechanisms 70 (e.g. first, second), if used, and/or opening 31. The distal end 21 of the rack 20 may be adjacent the pivot mechanism(s) 60, insertion space 90, rail 50 (e.g. distal end 51), if used, and/or back wall 34. Although the distal end 21 of the rack 20 may be angled upwardly relative to or away from the remaining portion (e.g. planar) of the rack, a variety of shapes may be used. Alternatively for example, the rack may be substantially planar. The angled portion or distal end 21 of the rack may pivot about the one or more pivot mechanisms 60. The orientation of the rack may be angled (e.g. first pivot position) when slidably engaging the air filter and/or rails, if used, to the pivot mechanism. The distal end 21 (e.g. angled) of the angled rack may pass through the insertion space 90 and/or pivot about the pivot mechanism 60 while the proximal end of the rack pivots towards to the second pivot position. This pivoting (e.g. from the first pivot position to the second pivot position, about the pivot mechanism) may reduce the filter space, engage/secure the air filter, and/or engage the retention mechanism, if used.

In some implementations, the air conditioning unit 10 and/or filter housing 30 may include or define at least one filter space 80. The first filter space 81 may be configured to receive and/or releasably engage an air filter. The first filter space 81 may be configured to receive a smaller air filter size (e.g. first size) than a second filter space 82 (e.g. second size), third filter space (e.g. third size), etc. increasing in size. The first filter space 81 or filter space(s) may be adjusted by one or more components (e.g. rack). The first filter space 81 may include or be defined by one or more first pivot mechanisms 61, one or more first retention mechanisms 71, one or more first guide rails 40*a*, and/or one or more first rails 53. The one or more first pivot mechanisms 61 may be spaced the first distance D11 from the first guide rails 40*a* (e.g. pair, opposing, spaced). The one or more first pivot mechanisms 61, or portions thereof, (e.g. one or more members, pins, etc.) may be adjacent the distal end 41 of the first guide rail(s) 40*a*. The one or more first retention mechanisms 71, if used, may be spaced the first distance D12 from the first guide rail(s). The first distances D11, D12 may be substantially the same or different in some embodiments. The one or more first retention mechanisms 71, or portions thereof, (e.g. latch, clip, fastener, pins, etc.) may be adjacent the proximal end 42 of the first guide rail(s) 40*a*. The rack 20 may include a proximal end 22 and a distal end 21. The proximal end 22 of the rack 20 may be adjacent the opening 31 of the filter housing 30 and/or one or more first retention mechanisms 71. The distal end 21 of the rack 20 may be adjacent the back wall 34 and/or one or more first pivot mechanisms 61. The distal end 21 of the rack 20 may be configured to pivot adjacent to, at, and/or via the one or more first pivot mechanisms 61 between at least one first pivot position and at least one second pivot position. The proximal/pivoting end 22 of the rack 20 pivots (e.g. about the pivot mechanism(s), about the distal end of the rack) from the first pivot position towards the proximal end 42 of the first guide rail(s) 40*a*, first rail 53, and/or one or more first retention mechanism 71 to decrease the first filter space 81 (e.g. between the rack and the pair of first guide rails). The one or more first retention mechanisms 71 may engage the proximal end 22 of the rack 20 when in the second pivot position. When the rack 20 is in the second pivot position associated with the first filter space 81, the rack 20 compresses/engages/holds/reduces movement of the air filter 1 (e.g. between the pivot mechanism and the retention mechanism). The one or more first rails 53, if used, (e.g. elongated members, pair) may be positioned between the one or more first pivot mechanism 61 and the one or more first guide rails 40*a*. The rack 20 may slidably engage (e.g. at one or more angles) the one or more first rails 53 (e.g. in and out of engagement with the pivot mechanism, slidably engage the pivot mechanism). The rack 20 may abut and/or be substantially parallel to the rail(s) 50 (e.g. first 53) when in the second pivot position. In some implementations, the filter housing 30, unit 10, and/or rack 20 may include the second filter space 82. The second filter space 82 may be larger than the first filter space 81. The second filter space 82 may encompass the first filter space 81 therein. The second filter space 82 may be configured to receive and/or releasably engage another air filter 1 (e.g. different size). The second filter space 82 may be configured to receive a larger air filter size (e.g. second size) than the first filter space 81 (e.g. first size). The second filter space 82 or filter space(s) may be adjusted by one or more components (e.g. rack). The second filter space 82 may include or be defined by one or more second pivot mechanisms 62, one or more second retention mechanisms 72, one or more first guide rails 40*a*, and/or one or more second rails 54. Although the first and second retention mechanisms are used in one embodiment, in some embodiments a single retention mechanism may be used in or for both the first filter space 81 and the second filter space 82. The one or more second pivot mechanisms 62 may be spaced the second distance D21 from the first guide rails 40*a* (e.g. pair, opposing, spaced). The second distance D21 is larger than the first distance D11. The one or more second pivot mechanisms 62, or portions thereof, (e.g. one or more members, pins, etc.) may be adjacent the distal end 41 of the first guide rail(s) 40*a*. The one or more second retention mechanisms 72, if used, may be spaced the second distance D22 from the first guide rail(s) 40*a*. The second distances D21, D22 may be substantially the same or different in some embodiments. The second distance D22 of the second retention mechanism 72 is larger than the first distance D21 of the first retention mechanism 71. The one or more second retention mechanisms 72, or portions thereof, (e.g. latch, clip, fastener, pins, etc.) may be adjacent the proximal end 42 of the first guide rail(s) 40*a*. The proximal end 22 of the rack 20 may be adjacent the opening 31 of the filter housing 30 and/or one or more second retention mechanisms 72. The distal end 21 of the rack 20 may be adjacent the back wall 34 and/or one or more second pivot mechanisms 62. The distal end 21 of the rack 20 may be configured to pivot adjacent to, at, and/or via the one or more second pivot mechanisms 62 between at least one first pivot position and at least one second pivot position. The proximal/pivoting end 22 of the rack 20 pivots (e.g. about the pivot mechanism (s), about the distal end of the rack) from the first pivot position towards the proximal end 42 of the first guide rail(s) 40*a*, second rail 54, and/or one or more second retention mechanisms 72 to decrease the second filter space 82 (e.g. between the rack and the pair of first guide rails). The one or more second retention mechanisms 72 may engage the proximal end 22 of the rack 20 when in the second pivot position. When the rack 20 is in the second pivot position associated with the second filter space 82, the rack compresses/engages/holds/reduces movement of the air filter 1 (e.g. between the pivot mechanism and the retention mechanism). The one or more second rails 54, if used, (e.g. elongated members, pair) may be positioned between the one or more second pivot mechanism 62 and the one or more first guide rails 40*a*. The rack 20 may slidably engage (e.g. at one or more angles) the one or more second rails 54 (e.g. in and out of engagement with the pivot mechanism, slidably engage the pivot mechanism). The rack 20 may abut and/or be substantially parallel to the rail(s) 50 (e.g. second) when in the second pivot position. In some implementations, the filter housing 30, unit 10, and/or rack 20 may include the third filter space 83. The third filter space 83 may be larger than the first filter space 81 and/or second filter space 82. The third filter space 83 may encompass the first filter space 81 and/or the second filter space 82 therein. The third filter space 83 may be configured to receive and/or releasably engage another air filter 1 (e.g. different size). The third filter space 83 may be configured to receive a larger air filter size (e.g. third size) than the first filter space 81 (e.g. first size) and the second filter space 82 (e.g. second size). The third filter space 83 or filter space(s) may be adjusted by one or more components (e.g. rack). The rack is removed from and/or no longer within the filter spaces/housing. The third filter space 83 may include or be defined by one or more second guide rails 40*b*/housing 30, or portions thereof, and/or one or more first guide rails 40*a*. The second guide rails 40*b*, if used, (e.g. pair) may be positioned further away from the first guide rail(s) 40*a* (e.g. pair) than the one or more first pivot mechanisms 61, the one or more second pivot mechanisms 62, if used, and/or one or more rails 50, if used (e.g. first, second, etc.). Although not shown, a retention mechanism may be used with the third filter space.

In some implementations, the one or more pivot mechanisms 60 (e.g. first, second, etc.) may be one or more members 64. The member (e.g. elongated) may include a proximal end 66 adjacent or towards the proximal end 42, 52 of the first guide rail(s) 40*a* and/or rail(s) 50 and/or a distal end 65 adjacent or towards the distal end 41, 51 of the first guide rail(s) 40*a* and/or rail(s) 50. In some embodiments, the elongated member 64 may be angled relative to the first guide rail(s) 40*a* and/or rail(s) 50, if used. If angled in some embodiments, the proximal end 66 of the pivot mechanism 60 may be positioned further from the guide rail(s) 40 and/or rail(s) 50, if used, than the distal end 65 of the elongated member 64. The member 64 may not be angled in some embodiments.

In some implementations, the rack 20 may be positionable between a first pivot position and a second pivot position. The first pivot position and the second pivot may be at least two pivot positions within a plurality of pivot positions. The pivot positions (e.g. first, second) of the rack 20 may be positions relative to the guide rail(s) 40 (e.g. first, second), pivot mechanism 60, and/or rails 50 to adjust the size of the filter space (e.g. first, second). The filter space 80 may include a proximal end 86 and a distal end 85. The proximal end 86 may be adjacent the retention mechanism 70/opening 31 of the filter housing 30. In some embodiments, the distal end 85, opposite the proximal end 86, may be adjacent the pivot mechanism 60 and/or back wall 34. In the first pivot position of the rack, the proximal or one end 86 (e.g. opening, space) of the filter space 80 (e.g. between the guide rail and the rack) may be larger (e.g. wider) than the distal or opposing end 85 (e.g. opening, space) of the filter space 80 (e.g. between the guide rail and the rack). In the second pivot position of the rack 20, the proximal or one end 86 (e.g. opening, space) of the filter space 80 (e.g. between the guide rail and the rack) may be substantially the same as the distal or opposing end 85 (e.g. opening, space) of the filter space 80 (e.g. between the guide rail and the rack). When in the first pivot position of the rack, the proximal end 86 of the filter space 80 (e.g. first, second, etc.) may be configured to stow and/or deploy the air filter 1. When in the first pivot position of the rack 20, the first filter space 81 and/or rack 20 may be disengaged from the air filter, or portions thereof. When in the second pivot position of the rack, the first filter space 81 may not be configured to stow and/or deploy the air filter 1. When in the second pivot position of the rack 20, the first filter space 81 and/or rack 20 may engage and/or secure the air filter, or portions thereof. When in the second pivot position, the rack 20 may be configured to apply a pressure/force across a planar surface (e.g. upstream, downstream) of the air filter from one or more pivot mechanisms 60 engaging one end 21 of the rack to an opposing pivoting end 22 of the rack 20. Further, the guide rails 40 may provide an opposing force against the opposing planar surface engaged by the rack 20. The guide rails 40 and/or corresponding force may be positioned at one or more edges of the periphery of the opposing planar surface. In some implementations, the rack 20 may be spaced (e.g. selected) from the guide rail(s) 40 to define the second filter space 82, wherein the rack is positionable between the first pivot position and the second pivot position relative to the guide rail(s) 40 (e.g. 40*a*), second rail(s) 54, and/or second pivot mechanism 62 to adjust the size of the second filter space 82. In some embodiments, one or more retention mechanisms 70 may engage the rack 20 when in at least the second pivot position when defining the first filter space or the second filter space. In some embodiments, the one or more pivot mechanisms 60 may pivot the rack to define the corresponding filter space 80 (e.g. first, second, etc.). The pivot mechanism(s) 60 may be a pair of pivot mechanisms spaced from each other on opposing side walls of the air conditioning unit and/or filter housing.

In some implementations, the one or more filter spaces 80 and/or rack(s) 20 may be adjusted to receive one or more air filters 1. The rack 20 may be pivoted from different pivot mechanisms 60 relative to the guide rail(s) 40 to correspond to a particular/predetermined filter space 80. When pivoting the rack 20, the air filter 1 may be disengaged when in the first pivot position and/or may be engaged when in the second pivot position. Adjusting the filter space 80 includes decreasing and/or increasing the size of the filter space(s) 80 when pivoting the rack. The user may slidably engage the rack to at least one pivot mechanism 60, different pivot mechanisms 60, and/or the different rails 50, if used. The different or one or more pivot mechanisms 60 may include a first pivot mechanism 61 proximal to the one or more guide rails and/or a second pivot mechanism 62 distal to the one or more guide rails. The first pivot mechanism 61 or the second pivot mechanism 62 may be selected to correspond to a desired or predetermined size of the air filter. The rack 20 may be inserted at an angle θ (e.g. relative to the guide rail, rail, pivot) when engaging the pivot mechanism or filter housing, or portions thereof. The rack 20 may be releasably engaged in at least one pivot position (e.g. second) relative to the guide rail(s) 40. One or more retention mechanisms 70 may releasably engage the rack in a fixed or pivot position. In some embodiments, one or more seal mechanisms (e.g. foam, gaskets, etc.) may be used to seal the air filter and/or the air conditioning unit, or portions thereof.

In use, when the rack 20 is temporarily deployed from the filter housing 30 the air filter may be stowed/deployed within at least one filter space. Alternatively if the rack (e.g. first pivot position) is already engaging the pivot mechanism 60, the air filter may be stowed/deployed along the guide rails 40. The rack 20 may slide (e.g. angled) upon the stowed air filter 1 (e.g. surface) and/or rails 50, if used. The rack 20 (e.g. distal end) may pass through the insertion space 90. The rack (e.g. distal end) may pivotably engage the corresponding pivot mechanism 60. The rack may be pivoted from the first pivot position to the second pivot position. The retention mechanism may automatically engage the rack 20 (e.g. proximal end) and/or may be manually engaged. When the air filter 1 needs to be replaced, the user may disengage the retention mechanism 70 and/or pivot the rack the rack 20 from the second pivot position to the first pivot position. The dirty air filter 1 may then be deployed or removed from the air filter housing 30. A replacement filter may then be reinserted and the rack pivoted upon and/or secured against the replacement filter. Alternatively if a different sized air filter 1 is to be installed, the rack may be repositioned to another or different filter space 80. The rack would engage to another rail 50, if used, and/or another pivot mechanism 60. Further, if a different sized filter(s) (e.g. one or more filters, prefilter, main filter) needs a filter space 80 that does not need a rack 20, the rack may be stowed and the air filter may be secured without the rack. For example, the third filter space 83 may receive the air filter.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein, unless characterized otherwise, are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the disclosure to the precise steps and/or forms disclosed, and obviously many modifications and variations are possible in light of the above teaching. It is intended that the scope of the disclosure and all equivalents be defined by the claims appended hereto.

The invention claimed is:

1. An air conditioning unit comprising:
at least one guide rail; and
a rack spaced from the at least one guide rail to define a first filter space, wherein the rack is positionable between a first pivot position and a second pivot position relative to the at least one guide rail to adjust the size of the first filter space, when in the first pivot position one end of the first filter space is larger than an opposing end of the first filter space and when in the second pivot position the one end and the opposing end of the first filter space are substantially the same; and
wherein when the rack is in the first pivot position the one end of the first filter space is configured to stow and/or deploy an air filter, and wherein when the rack is in the second pivot position the rack is not configured to stow and/or deploy the air filter.

2. The air conditioning unit of claim 1 wherein when in the first pivot position the rack is disengaged from the air filter and wherein when in the second pivot position the rack is engaged to the air filter.

3. The air conditioning unit of claim 1 wherein when in the second pivot position the rack is configured to apply a pressure across a planar surface of the air filter from one or more pivot mechanisms engaging one end of the rack to an opposing pivoting end of the rack.

4. The air conditioning unit of claim 1 wherein the rack slidably engages one or more pivot mechanisms.

5. The air conditioning unit of claim 1 wherein the rack is spaced from the at least one guide rail to define a second filter space, wherein the rack is positionable between a third pivot position and a fourth pivot position relative to the at least one guide rail to adjust the size of the second filter space.

6. The air conditioning unit of claim 1 wherein the at least one guide rail is a pair of guide rails.

7. The air conditioning unit of claim 1 further comprising one or more retention mechanisms engaging the rack when in the second pivot position.

8. The air conditioning unit of claim 1 further comprising one or more pivot mechanisms.

9. The air conditioning unit of claim 8 wherein the at least one guide rail includes a first guide rail spaced from a second guide rail,
wherein the one or more pivot mechanisms are positioned between the first guide rail and the second guide rail.

10. The air conditioning unit of claim 8 further comprising a plurality of the one or more pivot mechanisms, wherein the rack slidably engages to a single pivot mechanism of the plurality of the one or more pivot mechanisms.

11. The air conditioning unit of claim 8 wherein the one or more pivot mechanisms include a first pivot mechanism proximal to the at least one guide rail and a second pivot mechanism distal to the at least one guide rails.

12. The air conditioning unit of claim 8 wherein the one or more pivot mechanisms include a pair of pivot mechanisms spaced from each other on opposing side walls of the air conditioning unit.

13. The air conditioning unit of claim 8 wherein
the at least one guide rail includes a pair of first guide rails, wherein the pair of first guide rails include a proximal end and a distal end;
wherein the one or more first pivot mechanisms is spaced a first distance from the pair of first guide rails, wherein the one or more first pivot mechanisms are adjacent the distal end of the pair of first guide rails;
one or more first retention mechanisms spaced a second distance from the pair of first guide rails, wherein the one or more first retention mechanisms are adjacent the proximal end of the pair of first guide rails; and
the rack having a proximal end adjacent the one or more first retention mechanisms and a distal end adjacent the one or more first pivot mechanisms, wherein the distal end of the rack is configured to pivot adjacent the one or more first pivot mechanisms thereby pivoting the proximal end of the rack from the first pivot position towards the proximal end of the first guide rails to the second pivot position to decrease the first filter space defined between the rack and the pair of first guide rails, and wherein the one or more first retention mechanisms engage the proximal end of the rack when in the second pivot position.

14. The air conditioning unit of claim 13 further comprising a pair of first rails positioned between the one or more first pivot mechanisms and the pair of first guide rails, wherein the rack slidably engages the pair of first rails and the pair of first rails add flow resistance to the air by-pass flow around the filter.

15. The air conditioning unit of claim 13 further comprising one or more second pivot mechanisms spaced a third distance from the pair of first guide rails, wherein the third distance is larger than the first distance, and one or more second retention mechanisms spaced a fourth distance from the pair of first guide rails, wherein the fourth distance is larger than the second distance, and wherein the distal end of the rack is configured to pivot adjacent the one or more second pivot mechanisms thereby pivoting the proximal end of the rack from a first pivot position towards the proximal end of the pair of first guide rails to a second pivot position to decrease a second filter space defined between the rack and the pair of first guide rails, and wherein the one or more second retention mechanisms engage the proximal end of the rack when in the second pivot position.

16. The air conditioning unit of claim 13 further comprising a pair of second guide rails positioned further away from the pair of first guide rails than the one or more first pivot mechanisms and the one or more first retention mechanisms.

17. The air conditioning unit of claim 13 wherein the one or more first pivot mechanisms is at least one of a pin and/or an elongated member.

18. The air conditioning unit of claim 17 wherein the one or more first pivot mechanisms is the elongated member, wherein the elongated member includes a proximal end adjacent the proximal end of the pair of first guide rails and a distal end adjacent the distal end of the pair of first guide rails, and wherein the elongated member is angled relative to the pair of first guide rails whereby the proximal end of the elongated member is positioned further from the pair of first guide rails than the distal end of the elongated member.

* * * * *